(12) United States Patent
Miyata (10) Patent No.: US 10,871,610 B2
(45) Date of Patent: Dec. 22, 2020

(54) LIGHTING DEVICE AND DISPLAY DEVICE

(71) Applicant: SHARP KABUSHIKI KAISHA, Sakai (JP)

(72) Inventor: Tsuyoshi Miyata, Yonago (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/802,955

(22) Filed: Feb. 27, 2020

(65) Prior Publication Data
US 2020/0278490 A1 Sep. 3, 2020

Related U.S. Application Data

(60) Provisional application No. 62/812,520, filed on Mar. 1, 2019.

(51) Int. Cl.
*G02F 1/13357* (2006.01)
*F21V 8/00* (2006.01)

(52) U.S. Cl.
CPC ..... *G02B 6/0088* (2013.01); *G02F 1/133603* (2013.01); *G02F 1/133605* (2013.01); *G02F 1/133606* (2013.01); *G02F 1/133615* (2013.01)

(58) Field of Classification Search
CPC .................................................. G02B 6/0088
See application file for complete search history.

(56) References Cited

U.S. PATENT DOCUMENTS

2011/0205464 A1* 8/2011 Kim .................. G02F 1/133608
349/64

FOREIGN PATENT DOCUMENTS

JP 2011-186179 A 9/2011

\* cited by examiner

*Primary Examiner* — Sean P Gramling
*Assistant Examiner* — Keith G. Delahoussaye
(74) *Attorney, Agent, or Firm* — ScienBiziP, P.C.

(57) ABSTRACT

A lighting device includes: a light source; a plate-like optical member on which light from the light source falls; an optical sheet that imparts an optical effect to light emitted from the optical member; and an accommodating member that surrounds outer peripheral edges of the optical member and outer peripheral edges of the optical sheet. The optical sheet has a body part having a polygonal shape, extension portions provided on side portions of the body part and placed between the outer peripheral edges of the optical member and the chassis, and curtain portions, provided in corner portions of the body part, each of which connects the extension portions provided on adjacent ones of the side portions, and the extension portions and the curtain portions are provided with folds, respectively.

6 Claims, 7 Drawing Sheets

LIGHTING DEVICE AND DISPLAY DEVICE

TECHNICAL FIELD

The present invention relates to a lighting device and a display device.

BACKGROUND ART

A known example of a conventional liquid crystal display device is described in PTL 1 listed below. The liquid crystal display device described in PTL 1 includes a light source, a light-guiding body (light-guiding plate) that guides light from the light source, an optical sheet that imparts a predetermined optical effect to light from the light-guiding plate and emits the light to a liquid crystal panel, and a frame to which these members are fixed. The liquid crystal display device is characterized in that the optical sheet and the light-guiding plate are positioned by folding one side of the optical sheet, providing a projection at the front end thus folded, and fitting the projection into a depression formed in a side part of the light-guiding plate.

Incidentally, since an increase in operating temperature of the optical sheet leads to a thermal expansion of the optical sheet along a plate surface, bending of the plate surface due to contact of the expanded front end with the frame or the like undesirably causes nonuniform light or the like in the liquid crystal panel. To avoid this problem, the conventional liquid crystal display device has a predetermined gap (clearance space) secured between the optical sheet and the frame.

CITATION LIST

Patent Literature

[PTL 1] Japanese Unexamined Patent Application Publication No. 2011-186179

SUMMARY OF INVENTION

Technical Problem

This clearance space may allow entry of a foreign substance such as dust from outside the liquid crystal display device. Since the clearance space is located in a non-display region of the liquid crystal panel, entry of a foreign substance usually does not affect an image display. However, vibration or the like might cause the foreign substance to move from the clearance space into a display region between the optical sheet and the liquid crystal panel. In that case, the foreign substance undesirably causes a deterioration in image display, for example, by appearing as a black dot on the liquid crystal panel.

The present invention was made in view of the above circumstances. An object is to inhibit bending of an optical sheet and prevent entry of a foreign substance into a space between the optical sheet and a liquid crystal panel.

Solution to Problem (1) One embodiment of the present invention is directed to a lighting device including: a light source; a plate-like optical member on which light from the light source falls; an optical sheet that imparts an optical effect to light emitted from the optical member; and an accommodating member that surrounds outer peripheral edges of the optical member and outer peripheral edges of the optical sheet, wherein the optical sheet has a body part having a polygonal shape, extension portions provided on side portions of the body part and placed between the outer peripheral edges of the optical member and the accommodating member, and curtain portions, provided in corner portions of the body part, each of which connects the extension portions provided on adjacent ones of the side portions, and the extension portions and the curtain portions are provided with folds, respectively.

(2) Further, an embodiment of the present invention is directed to the lighting device according to the configuration (1) described above, wherein the body part, the extension portions, and the curtain portions are formed by a single sheet member.

(3) Further, an embodiment of the present invention is directed to the lighting device according to the configuration (1) or (2) described above, wherein each of the extension portions is provided so as to extend in a predetermined direction from a corresponding one of the side portions and provided with a fold that crosses the direction of extension.

(4) Further, an embodiment of the present invention is directed to the lighting device according to any one of the configurations (1) to (3) described above, wherein the optical member is a light-guiding plate having an entrance end face which is a portion of the outer peripheral edges and on which the light from the light source falls and a light exit plate surface which is either of a pair of plate surfaces and through which the light is emitted, and the extension portions are provided for each separate one of the side portions excluding the side portion facing the entrance end face of the light-guiding plate.

(5) Further, an embodiment of the present invention is directed to the lighting device according to any one of the configurations (1) to (3) described above, wherein the optical member is a diffusion plate having a light entrance face which is a first one of a pair of plate surfaces on which the light from the light source falls and a light exit surface which is a second one of the pair of plate surfaces and through which the light is emitted, and the extension portions are provided for each separate one of all of the side portions.

(6) Further, an embodiment of the present invention is directed to a display device including: the lighting device according to any one of the configurations (1) to (5) described above; and a display panel that displays an image with light emitted from the lighting device.

Advantageous Effects of Invention

The present invention makes it possible to inhibit bending of an optical sheet and prevent entry of a foreign substance into a space between the optical sheet and a liquid crystal panel.

DESCRIPTION OF EMBODIMENTS

Embodiment 1

Embodiment 1 is described with reference to FIGS. 1 to 4. The present embodiment illustrates a liquid crystal display device (which is an example of the display device) 10 including a backlight device 30 (which is an example of the lighting device) that illuminates a liquid crystal panel 20 (which is an example of the display panel) with light. Some of the drawings show an X axis, a Y axis, and a Z axis and are drawn so that the direction of each axis is an identical direction in each drawing. Further, the liquid crystal panel 20 is on a side that faces forward along the Z axis, and the backlight device 30 is on a side that faces backward along the Z axis.

Figure 1:
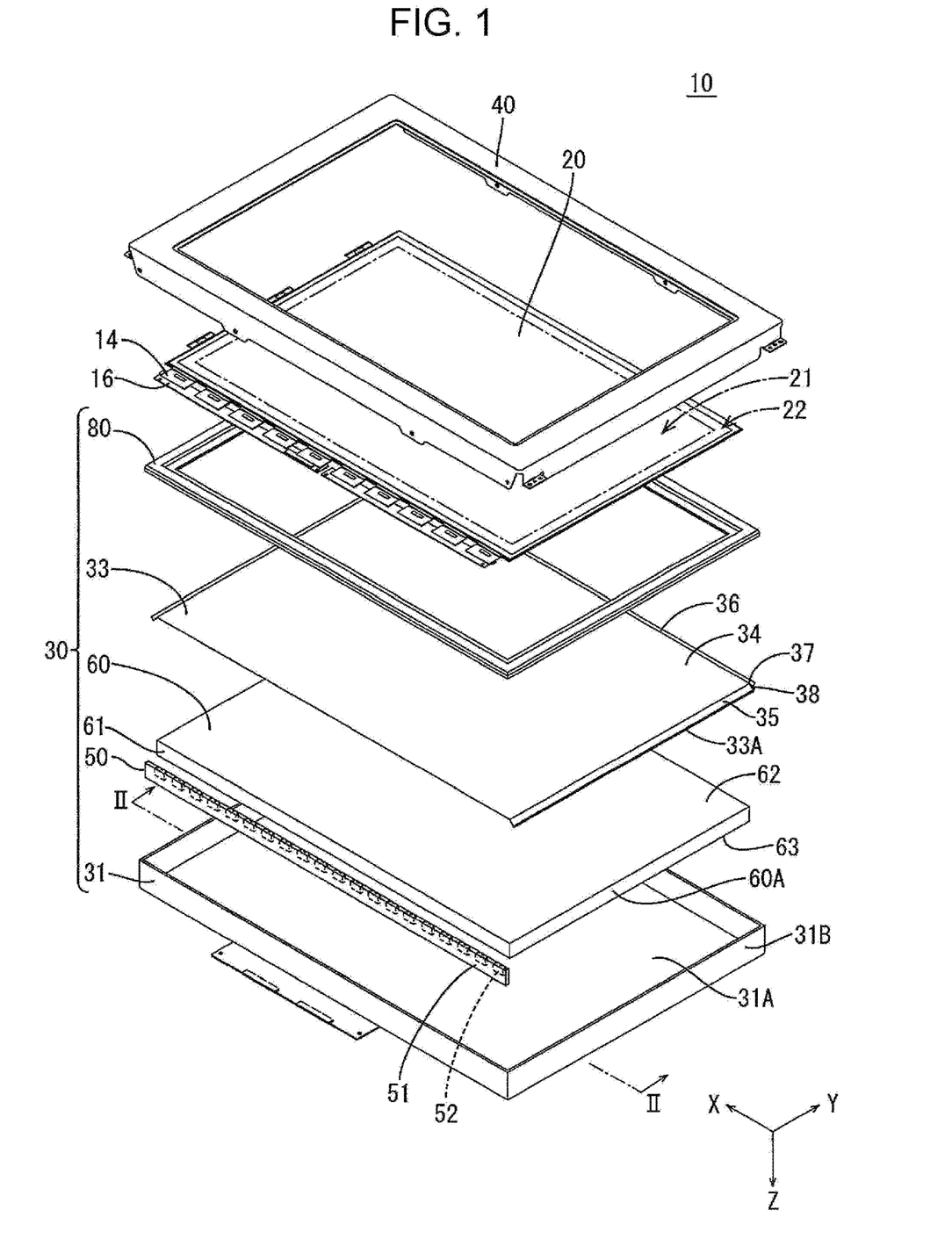
FIG. 1 is an exploded perspective view of a liquid crystal display device according to Embodiment 1 of the present invention.
Figure 2:
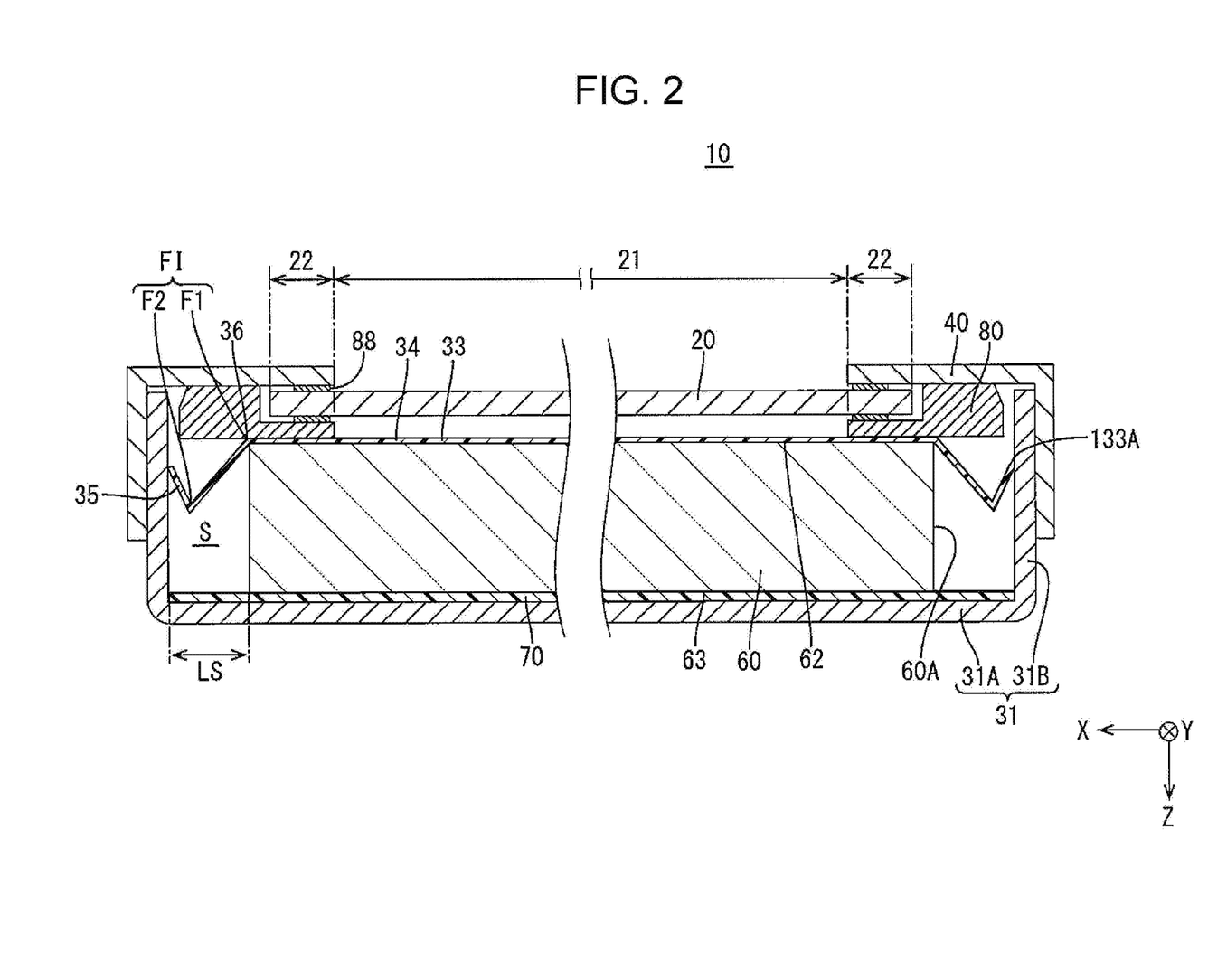
FIG. 2 is a cross-sectional view taken along line II-II in FIG. 1.

As shown in FIGS. 1 and 2, the liquid crystal display device 10 according to the present embodiment includes the liquid crystal panel 20, which displays an image, and the backlight device 30, which illuminates the liquid crystal panel 20 with light, and is configured such that the liquid crystal panel 20 and the backlight device 30 are integrally held by a bezel 40, a frame 80, and the like, which are frame-shaped supporting members. The liquid crystal panel 20 is assembled in such a position that a display surface on which an image can be displayed faces forward (outward). The liquid crystal panel 20 has a horizontally-long square shape as a whole, and has a surface the interior of which is divided into a display region (active area) 21 on which an image can be displayed and which is placed on a central side and a peripheral edge 22 serving as a non-display region (non-active area) forming the shape of a frame in plan view in such a manner as to surround the display region 21. Connected to the liquid crystal panel 20 via a flexible substrate 14 serving as a flexible circuit board is a control substrate 16, such as a system LSI, that supplies image data and various types of control signals that are needed for an image display.

The liquid crystal panel 20 includes a pair of transparent glass substrates bonded together at a predetermine gap and a liquid crystal layer sealed in between the two glass substrates. One of the glass substrates is provided with switching elements (e.g. TFTs) connected to source lines and gate lines that are orthogonal to each other, pixel electrodes connected to the switching elements, an alignment film, and the like, and the other glass substrate is provided with a color filter having a predetermined array of colored portions such as R (red), G (green), and B (blue) portions, a counter electrode, an alignment film, and the like.

As shown in FIGS. 1 and 2, the bezel 40 extends along the front side of the peripheral edge 22 of the liquid crystal panel 20 and forms a front appearance of the liquid crystal display device 10. The frame 80 is made of metal or resin and extends along the back side of the peripheral edge 22 of the liquid crystal panel 20. The liquid crystal panel 20 is held between the frame 80 and the bezel 40 with a cushioning material 88 placed between the liquid crystal panel 20 and each of these members.

The following describes a configuration of the backlight device 30. As shown in FIGS. 1 and 2, the backlight device 30 includes a chassis 31 (which is an example of the accommodating member) formed substantially in the shape of a box having an opening facing forward (i.e. toward a light exit side or toward the liquid crystal panel 20), and the chassis 31 has accommodated therein an LED unit 50 including an LED 52 (which is an example of the light source), a plate-like light-guiding plate 60 (which is an example of the optical member) on which light from the LED 52 falls, an optical sheet 33 that imparts a predetermined optical effect to light emitted from the light-guiding plate 60, and a reflective sheet 70 that reflects leaked light toward the light-guiding plate 60.

In the chassis 31, the light-guiding plate 60 has its long-side side surface (entrance end face) 61 placed in a position that faces the LED 52, and light emitted from the LED 52 is guided toward the liquid crystal panel 20 by the light-guiding plate 60. That is, the backlight device 30 according to the present embodiment is of a so-called edge-light type (side-light type) in which the LED 52 is placed besides the back side of the liquid crystal panel 20.

The chassis 31 is made of metal such as aluminum and, as shown in FIGS. 1 and 2, includes a bottom plate 31A having a horizontally-long square shape as is the case with the liquid crystal panel 20 and side plates 31B rising from outer peripheral edges of the bottom plate 31A. The side plates 31B surround outer peripheral end faces 60A (which are examples of the outer peripheral edges) of the light-guiding plate 60 and outer peripheral end faces 33A (which are examples of the outer peripheral edges) of the optical sheet 33.

As shown in FIGS. 1 and 2, the LED unit 50 includes an LED substrate 51 made of resin and formed in a rectangular shape and a plurality of the LEDs 52 placed at regular intervals in a line on the LED substrate 51. As shown in FIG. 1, the LED substrate 51 forms the shape of a long and thin plate extending along one long side (X axis) of the chassis 31. The LED substrate 51 is provided opposite the entrance end face 61 of the light-guiding plate 60 at a predetermined spacing from the light-guiding plate 60, and the LED 52 is surface-mounted on a plate surface of the LED substrate 51 that faces the entrance end face 61.

The light-guiding plate 60 is made of a substantially transparent synthetic resin material (e.g. acrylic resin such as PMMA or polycarbonate) whose refractive index is sufficiently higher than that of air. As shown in FIGS. 1 and 2, the light-guiding plate 60 is in the shape of a plate which has a horizontally-long square shape in plan view as is the case with the liquid crystal panel 20 and the chassis 31 and whose thickness is greater than that of the optical sheet 33. The light-guiding plate 60 guides, through the entrance end face 61, light emitted from the LED 52 along the Y axis, raises the light toward the optical sheet 33 while propagating the light inside, and allows the light to be emitted through a front surface (light exit plate surface) 62.

The reflective sheet 70 is a rectangular sheet, made of synthetic resin, that has a white surface that is superior in light reflectivity. The reflective sheet 70 is disposed between a back surface 63 of the light-guiding plate 60 and the bottom plate 31A of the chassis 31. The reflective sheet 70 reflects, toward the light-guiding plate 60, light having leaked from the LED 52 or the back surface 63 of the light-guiding plate 60.

The optical sheet 33 has flexibility and, by being interposed between the liquid crystal panel 20 and the light-guiding plate 60, imparts a predetermined optical effect to light emitted from the light-guiding plate and, at the same time, allows the light to be emitted toward the liquid crystal panel 20. A usable example of the optical sheet 33 include a diffusion sheet that diffuses light, a lens sheet that imparts a light-gathering effect to light, a reflective polarizing sheet that polarizes light, a wavelength conversion sheet that converts light into another wavelength, and the like, or a stack of these sheets may be used. The various types of sheet are composed of substrates made of synthetic resin materials.

Figure 3:
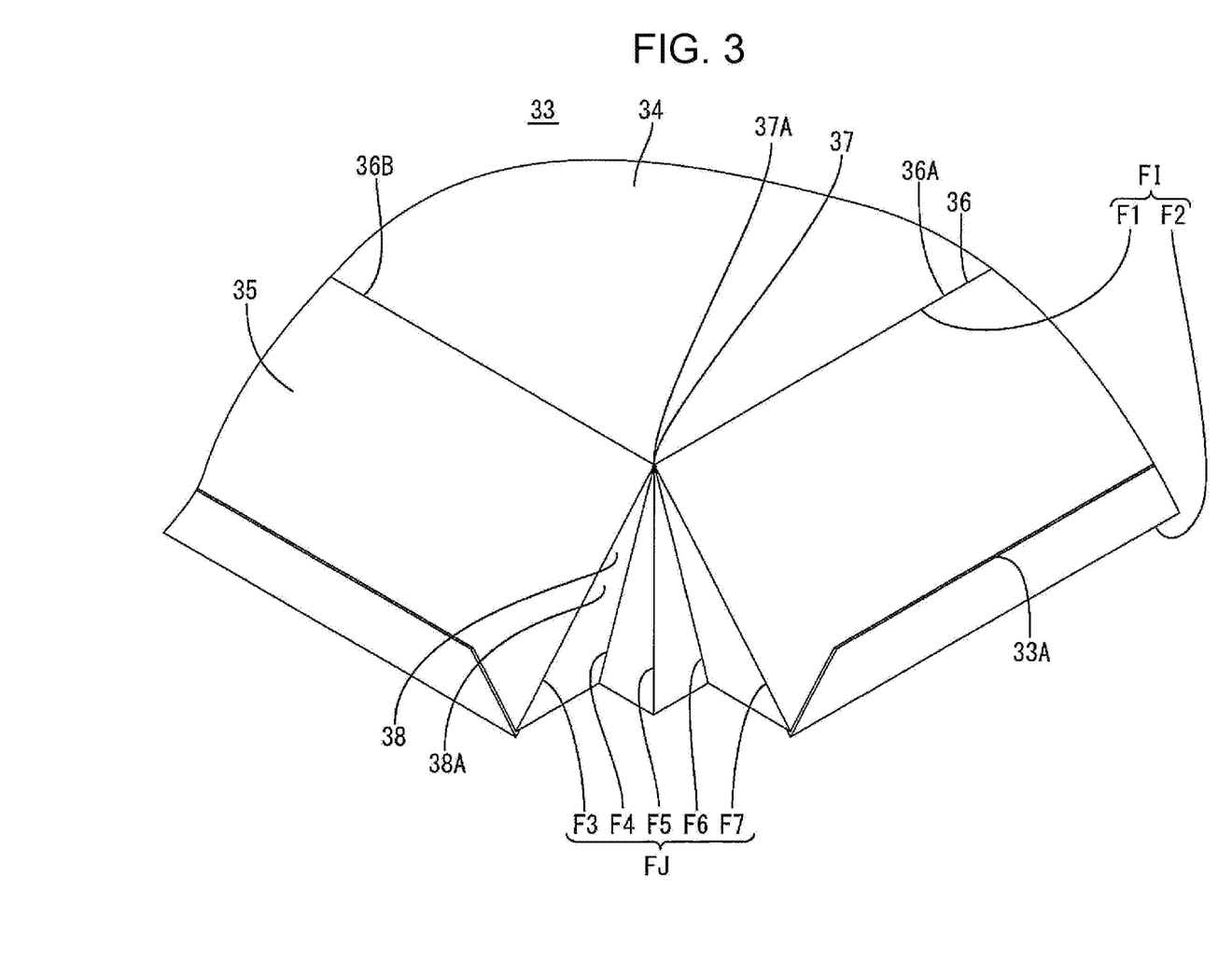
FIG. 3 is an enlarged perspective view of an area around a curtain portion of an optical sheet.
Figure 4:
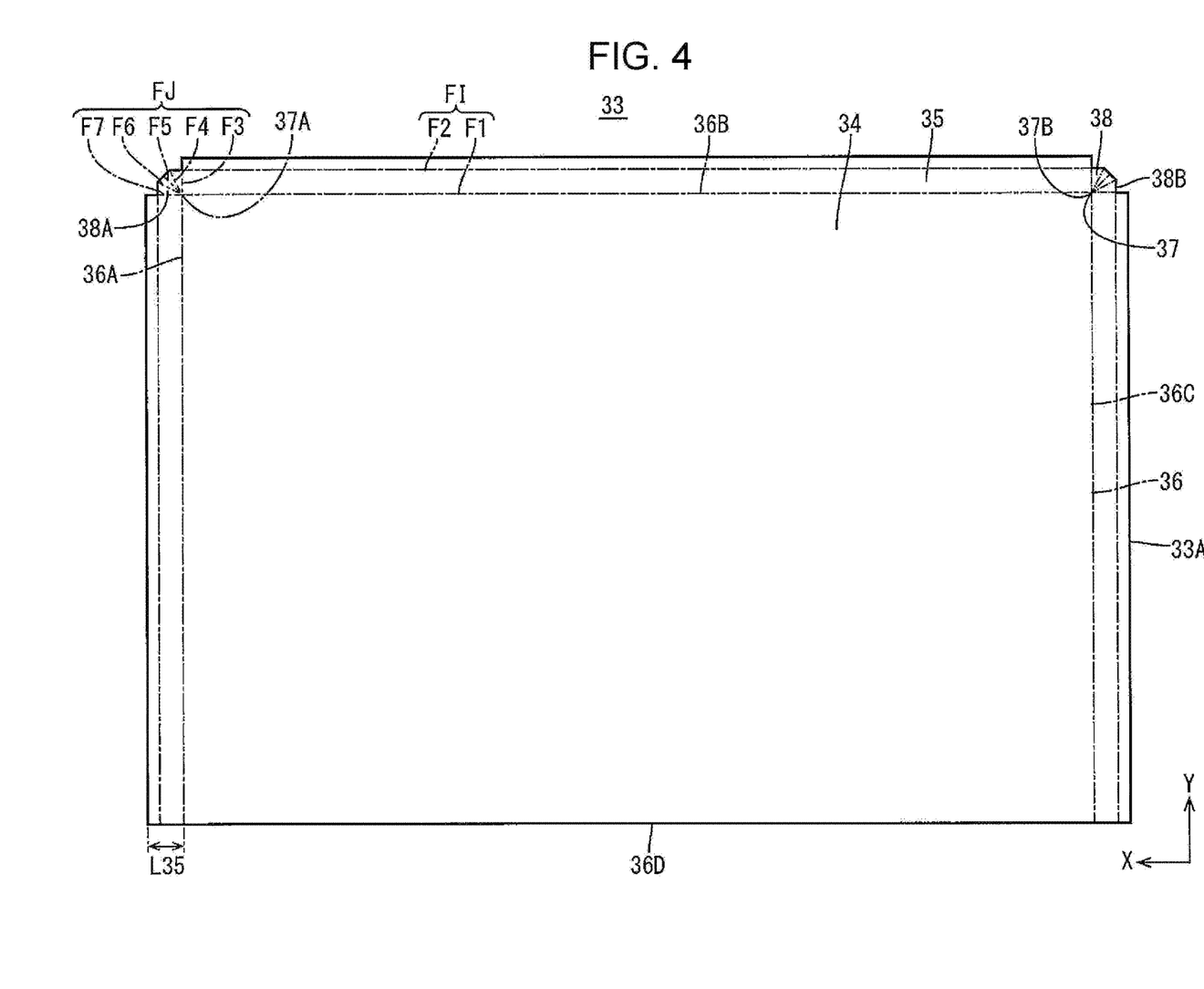
FIG. 4 is a plan view of the optical sheet with its folds unfolded.

As shown in FIGS. 3 and 4, the optical sheet 33 has a plate-like body part 34, extension portions 35 provided on side portions 36 of the body part 34, and curtain portions 38, provided in corner portions 37 of the body part 34, each of which connects the extension portions 35 provided on adjacent ones of the side portions 36. The body part 34 has a horizontally-long square shape (which is an example of the polygonal shape) in plan view in conformance with the shape of the light-guiding plate 60, and has a size that overlaps at least the whole of the light exit plate surface 62 of the light-guiding plate 60. The extension portions 35 are provided on the three side portions 36A, 36B, and 36C, included in the four sides portions 36, that excludes the side portion facing the entrance end face 61 of the light-guiding plate 60, and as shown in FIG. 2, the extension portions 35 are placed so as to cover spaces (clearance spaces S) between the outer peripheral end faces 60A of the light-guiding plate and the side plates 31B of the chassis 31. The length L35 of each of the extension portions 35 is longer than the length LS of each of the clearance spaces S, and this placement of the extension portions 35 prevents foreign substances such as dust from moving to the front side of the optical sheet 33 even in a case where the foreign substances have entered the clearance spaces S from outside for some reason, as the extension portions 35 covers the clearance spaces S.

As shown in FIGS. 3 and 4, the extension portions 35 are placed so as to cover ones of the clearance spaces S excluding the clearance space S facing the entrance end face 61. If an extension portion 35 is placed so as to cover the clearance space S facing the entrance end face 61, a portion of incident light from the LED 52 onto the light-guiding plate 60 is blocked by the extension portion 35. This placement of the extension portions 35 covering the clearance spaces S excluding the clearance space S facing the entrance end face 61 makes it possible to prevent a decrease in rate of incidence of light from the LED 52 onto the light-guiding plate 60 and, at the same time, inhibit a foreign substance from moving into the display region 21 between the optical sheet 33 and the liquid crystal panel 20.

As shown in FIG. 4, each of the extension portions 35 is formed so as to extend from a corresponding one of the side portions 36 outward (i.e. away from the center of the body part 34). Each of the extension portions 35 is provided with folds FI (F1 and F2) oriented across the direction of extension (along a corresponding one of the side portions 36). The optical sheet 33 thermally expands along a plate surface at a higher operating temperature. In that case, the provision of the extension portions 35 with the folds FI causes the extension portions 35 to contract by being pressed against the side plates 31B of the chassis 31. The contraction of the extension portions 35 allows the amount of expansion of the optical sheet 33 to be absorbed by the folds FI. As a result, bending of the body part 34 of the optical sheet 33 is inhibited even when thermal expansion occurs, so that the flatness of the body part 34, which contributes to an optical effect, can be maintained.

Further, as shown in FIG. 4, each of the extension portions 35 has its first fold F1 formed at its boundary with the body part 34. This makes it easy to form a plurality of folds even in a case where the liquid crystal display device 10 has a narrow frame and the length L35 of each of the extension portions 35 is short. As shown in FIG. 2, each of the extension portions 35 is provided with a sequence of a first fold F1 that forms a mountain shape along the direction of extension (i.e. that projects toward the front side of the optical sheet 33) and a second fold F2 that forms a valley shape (i.e. that projects toward the back side of the optical sheet 33); however, this sequence is not intended to impose any limitation, provided at least two folds are formed and a valley fold and a mountain fold alternately appear. Further, the number of folds FI may vary as appropriate according to the size or the like of each of the extension portions 35, and the folds FI do not need to be placed at regular intervals.

As shown in FIGS. 3 and 4, the curtain portions 38 are provided in the corner portions 37A and 37B so as to connect the extension portions 35 provided on the side portions 36A, 36B, and 36C. More specifically, there are provided a curtain portion 38A that connects the extension portions 35 provided on the side portions 36A and 36B adjacent to each other and a curtain portion 38B that connects the extension portions 35 provided on the side portions 36B and 36C adjacent to each other. If there are provided no curtain portions 38, the formation of a gap between the extension portions 35 provided on the adjacent side portions 36 might allow a foreign substance to move to the front side of the optical sheet 33 through the gap. Providing the curtain portions 38 makes it possible to prevent this sort of problem.

Each of the curtain portions 38 is also provided with folds FJ (F3, F4, F5, F6, and F7) extending from a corresponding one of the corner portions 37 outward (i.e. away from the center of the body part 34), and this forms the curtain portions 38 into curtain shapes as shown in FIG. 3. Each of the curtain portions 38 is provided with three folds F4, F5, and F6 formed between folds F3 and F7 formed at the boundary with the extension portions 35 that the curtain portion 38 connects. The folds F3 and F7 located at the boundary with each of the extension portions 35 are mountain folds between which the valley folds F4 and F6 and the mountain fold F5 alternately appear; however, this sequence is not intended to impose any limitation, provided valley folds and mountain folds alternately appear. Further, the number of folds FJ may vary as appropriate according to the size or the like of each of the curtain portions 38, and the folds FJ do not need to be placed at regular intervals.

Providing the curtain portions 38 in this way allows an amount of thermal expansion, if any, of the optical sheet 33 to be absorbed by the folds FJ as is the case with the folds FI of the extension portions 35, thus inhibiting bending of the body part 34 of the optical sheet 33. Further, providing the folds FJ makes it possible to integrally provide the extension portions 35 and the body part 34 with the curtain portions 38 through the use of a single flat sheet member. If these components are formed as separate entities and joined to one another, repeated thermal expansion of the optical sheet 33 might loosen the joints, with the result that foreign substances may move to the front side of the optical sheet 33 through the loose joints. The integrated formation by a single sheet member makes it possible to avoid this sort of problem, thus making it possible to more surely prevent entry of a foreign substance into a space between the optical sheet 33 and the liquid crystal panel 20.

According to the present embodiment, as described above, there is provided a backlight device 30 including: a light source 52; a plate-like optical member 60 on which light from the light source 52 falls; an optical sheet 33 that imparts an optical effect to light emitted from the optical member 60; and an accommodating member 31 that surrounds outer peripheral edges 60A of the optical member 60 and outer peripheral edges 33A of the optical sheet 33. The optical sheet 33 has a body part 34 having a square shape, extension portions 35 provided on side portions 36 of the body part 34 and placed between the outer peripheral edges 60A of the optical member 60 and the chassis 31, and curtain portions 38, provided in corner portions 37 of the body part 34, each of which connects the extension portions 35 provided on adjacent ones of the side portions 36, and the extension portions 35 and the curtain portions 38 are provided with folds FI and FJ, respectively.

With this, even in the case of entry of foreign substances such as dust into the clearance spaces S, the foreign substances are prevented from moving to the front side of the optical sheet, as the extension portions 35 cover the clearance spaces S. Further, the curtain portions 38, which connect the extension portions 35 to one another, make it possible to inhibit foreign substances from moving to the front side of the optical sheet through gaps between the extension portions 35. This may result in prevention of a deterioration in image display such as a case where a foreign substance having moved into the display region 21 between the optical sheet 33 and the liquid crystal panel 20 appears as a block dot in the display region 21. Furthermore, the provision of the extension portions 35 and the curtain portions 38 with the folds FI and FJ, respectively, allows an amount of thermal expansion, if any, of the optical sheet 33 to be absorbed by the folds FI and FJ. With this, bending of the body part 34 of the optical sheet 33 is inhibited, so that the flatness of the body part 34, which contributes to an optical effect of the optical sheet 33, can be maintained.

Embodiment 2

Embodiment 2 of the present invention is described with reference to FIGS. 5 to 7. Embodiment 2 shows a backlight device having changed from Embodiment 1 described above to a direct type. It should be noted that a repeated description of structures, actions, and effects which are similar to those of Embodiment 1 described above is omitted.

A backlight device 130 includes a diffusion plate (which is another example of the optical member) 160 placed so as to cover an opening of a chassis 131 and an optical sheet 133 that imparts a predetermined optical effect to light emitted from the diffusion sheet 160. The chassis 131 has accommodated therein an LED 152 placed in a position directly below the diffusion plate 160 (liquid crystal panel 20) in such a manner as to face the diffusion plate 160, an LED substrate 151 on which the LED 152 is mounted, and a reflective sheet 170 that reflects light in the chassis 131 toward the diffusion plate 160. In this way, the backlight device 130 according to the present embodiment constitutes a so-called a direct backlight device in which the LED 152 is placed so as to face the entire lower side of the liquid crystal panel 20.

Figure 5:
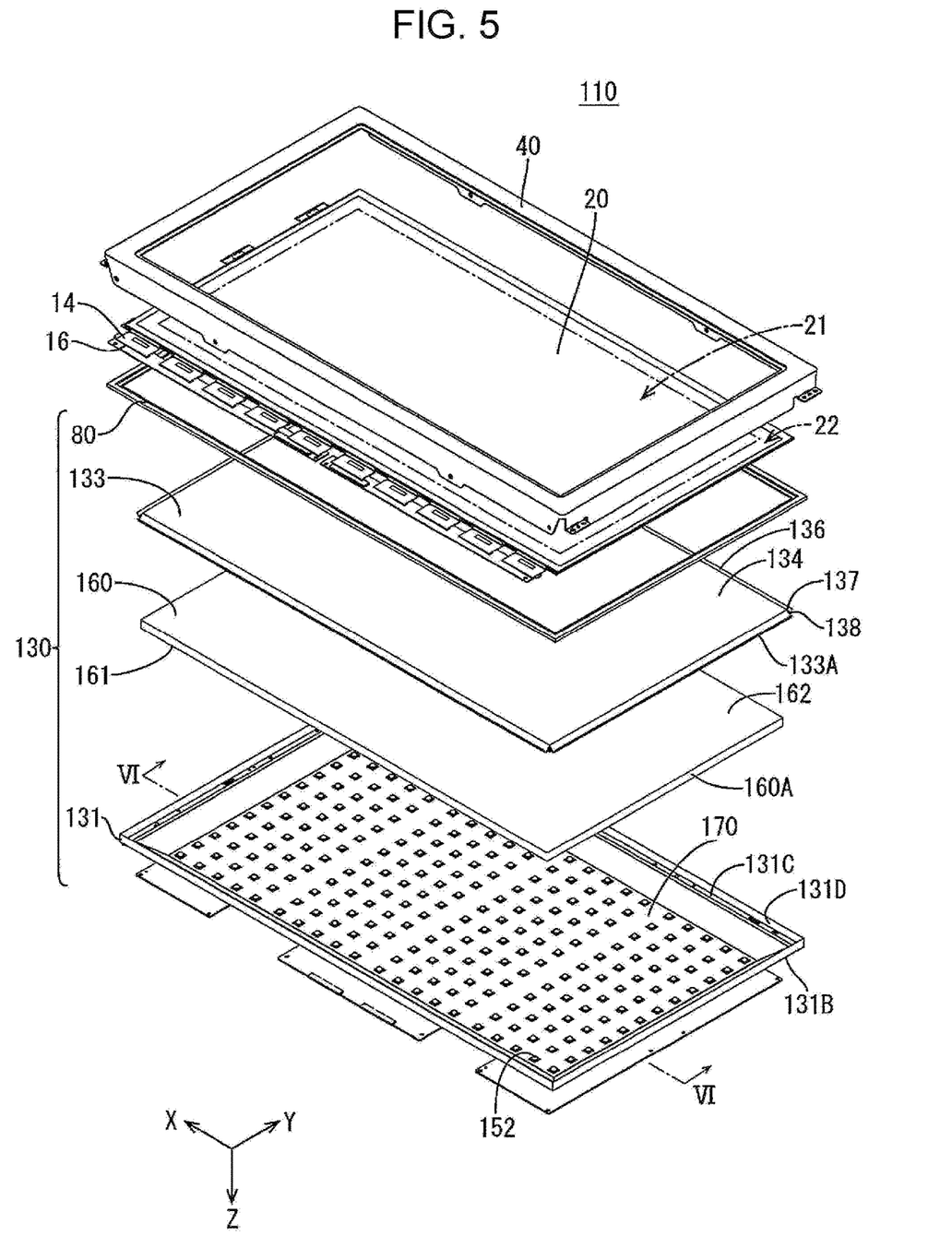
FIG. 5 is an exploded perspective view of a liquid crystal display device according to Embodiment 2.
Figure 6:
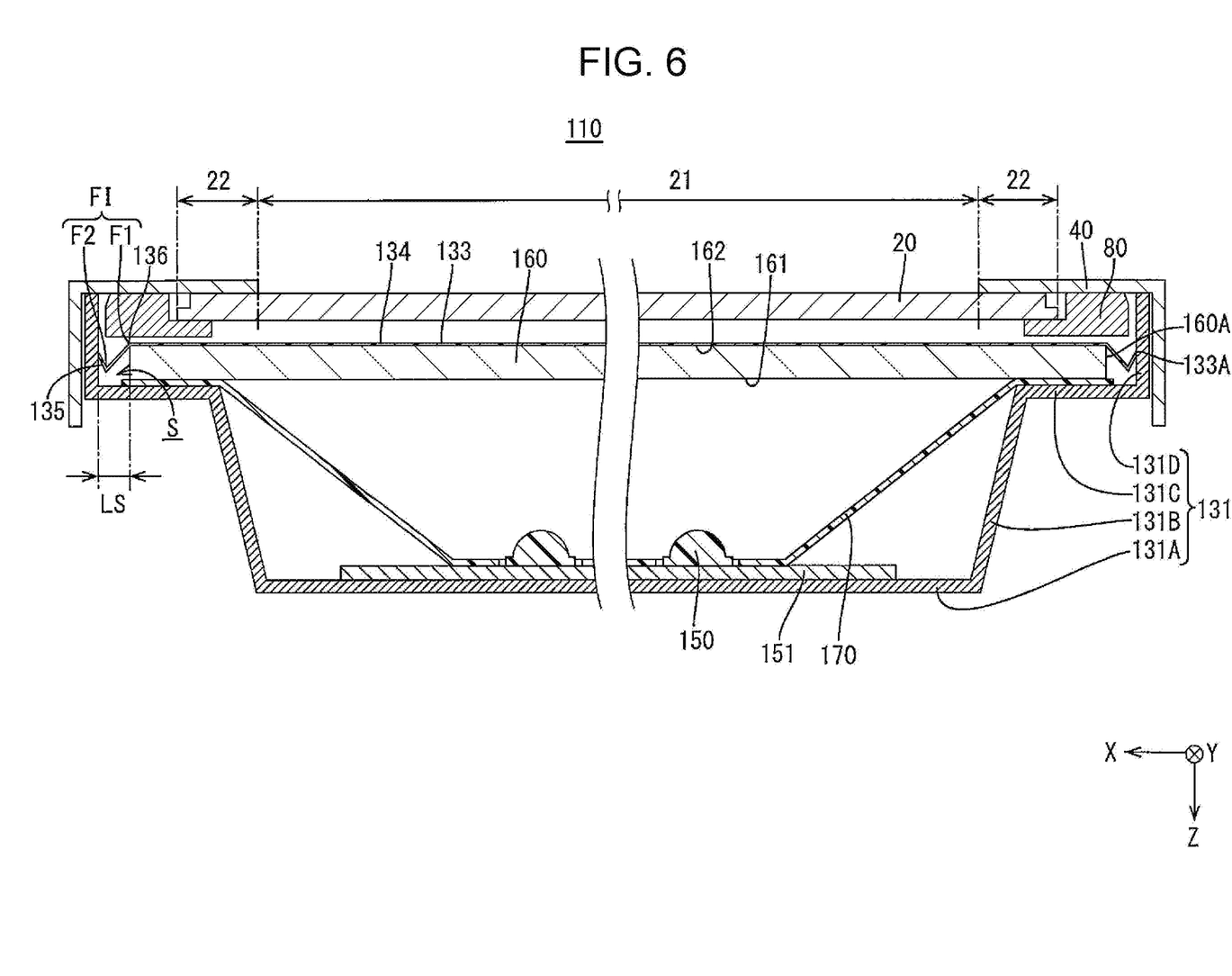
FIG. 6 is a cross-sectional view taken along line VI-VI in FIG. 5.

The chassis 131 is made of metal and, as shown in FIGS. 5 and 6, has a bottom part 131A having a horizontally-long square shape as is the case with the liquid crystal panel 20, side parts 131B rising from the outer ends of the sides, respectively, of the bottom part 131A forward (i.e. toward a light exit side), receiving parts 131C stretching outward from the rising edges of the side parts 131B, respectively, and side plates 131D extending from the outer peripheral edges of the receiving parts 131C forward and, as a whole, is formed substantially in the shape of a shallow box having an opening facing forward. The side plates 131D of the chassis 131 surround outer peripheral end faces 160A (which are examples of the outer peripheral edges) of the diffusion plate 160 and outer peripheral end faces 133A (which are examples of the outer peripheral edges) of the optical sheet 133.

As shown in FIGS. 5 and 6, the LED substrate 151 has a square shape and is accommodated while extending along the bottom part 131A of the chassis 131. The LED substrate 151 has plate surfaces including a forward plate surface (mounting surface) on which a plurality of the LEDs 152 are arranged side by side in rows and columns (i.e. in a matrix or a grid) at substantially regular internals in an X-axis direction (row-wise direction) and a Y-axis direction (column-wise direction). The LEDs 152 are electrically connected to one another by a wiring pattern routed in the mounting surface.

The reflective sheet 170 has a white surface that is superior in light reflectivity and, as shown in FIGS. 5 and 6, has a size that covers substantially the entire inner surface of the chassis 131. The reflective sheet 170 has a substantially conical shape as a whole and reflects, toward the diffusion plate 160, light having leaked from the LEDs 152 and the back side of the diffusion plate 160.

As shown in FIGS. 5 and 6, the diffusion plate 160 is greater in plate thickness than the optical sheet 133 and has its outer peripheral edges overlapped with the receiving parts 131C of the chassis 131 across the reflective sheet 170. Light emitted from the LEDs 152 forward falls on a back plate surface (light entrance surface) 161 of the diffusion plate 160 and is diffusely emitted from a front plate surface (light exit surface) 162 of the diffusion plate 160 toward the optical sheet 133.

Figure 7:
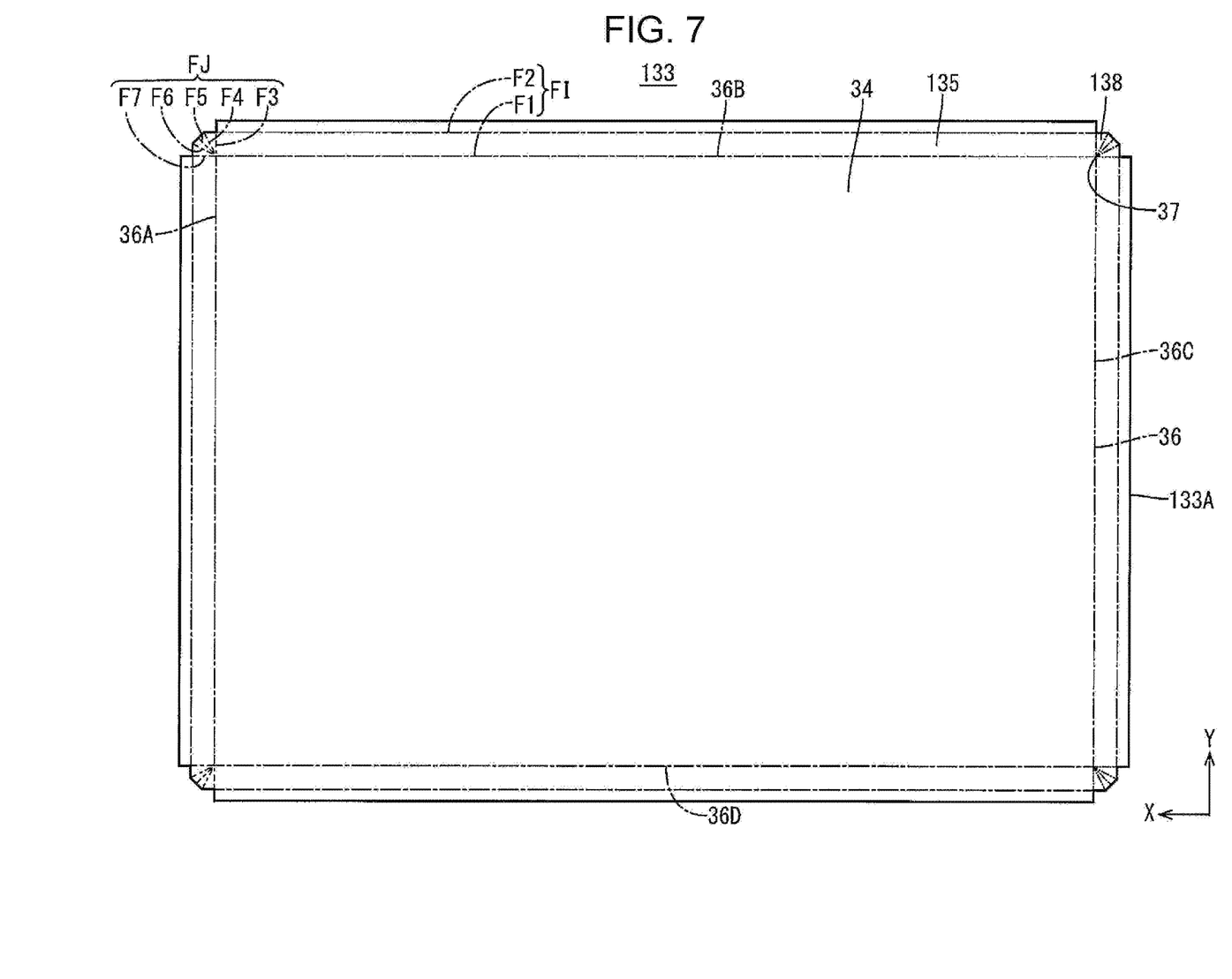
FIG. 7 is a plan view of an optical sheet with its folds unfolded.

As shown in FIGS. 5 and 7, the optical sheet 133 has a plate-like body part 34 which is similar to that of Embodiment 1, but unlike in Embodiment 1, extension portions 135 are provided on all 36A, 36B, 36C, and 36D of the four side portions 36 of the body part 34. As shown in FIG. 6, the extension portions 135 are placed in clearance spaces S between the outer peripheral end faces 160A of the diffusion plate 160 and the side plates 131D of the chassis 131. Further, curtain portions 138 which are similar to those of Embodiment 1 are provided so as to connect the extension portions 135 to one another. In this way, all of the clearance spaces S are covered by the extension portions 135 and the curtain portions 138. This surely inhibits a foreign substance from causing a deterioration in image display by entering a space between the optical sheet 133 and the liquid crystal panel 20 and moving into the display region 21 of the liquid crystal panel 20.

Other Embodiments

The present invention is not limited to the embodiments described above with reference to the drawings. The following embodiments may be included in the technical scope of the present invention.

(1) The extension portions according to each of the embodiment described above may have their front end portions fixed to the side plates of the chassis with an adhesive tape or the like. This makes it possible to more surely cover the clearance space.

(2) Grooves, perforations, or the like may be formed in the folds of the extension portions and the curtain portions according to each of the embodiments described above. They serve as marks for the folds and make it easier to form the folds.

(3) Although Embodiment 1 described above has taken as an example of the backlight device an edge-lighting backlight device of a one-sided light-entrance type, the backlight device may be an edge-lighting backlight device of a two-sided light-entrance type.

(4) Although each of the embodiments described above has illustrated a liquid crystal panel as the display panel, the present invention is also applicable to other types of display panel (such as an organic EL panel, a PDP (plasma display panel), an EPD (electrophoretic display panel), a MEMS (microelectromechanical system) display panel).

The invention claimed is:

1. A lighting device comprising:
    a light source;
    a plate-like optical member on which light from the light source emits to;
    an optical sheet that imparts an optical effect to light emitted from the optical member; and
    an accommodating member that surrounds outer peripheral edges of the optical member and outer peripheral edges of the optical sheet,
    wherein the optical sheet has a body part having a polygonal shape, extension portions provided on side portions of the body part and placed between the outer peripheral edges of the optical member and the accommodating member, and curtain portions, provided in corner portions of the body part, each of which connects the extension portions provided on adjacent ones of the side portions, and
    the extension portions and the curtain portions are provided with folds, respectively.

2. The lighting device according to claim 1, wherein the body part, the extension portions, and the curtain portions are formed by a single sheet member.

3. The lighting device according to claim 1, wherein each of the extension portions is provided so as to extend in a predetermined direction from a corresponding one of the side portions and provided with a fold that crosses the direction of extension.

4. The lighting device according to claim 1, wherein the optical member is a light-guiding plate having an entrance end face which is a portion of the outer peripheral edges of the optical member and on which the light from the light source emits to and a light exit plate surface which is either of a pair of plate surfaces and through which the light is emitted, and
    the extension portions are provided for each separate one of the side portions excluding the side portion facing the entrance end face of the light-guiding plate.

5. The lighting device according to claim 1, wherein the optical member is a diffusion plate having a light entrance face which is a first one of a pair of plate surfaces on which the light from the light source emits to and a light exit surface which is a second one of the pair of plate surfaces and through which the light is emitted, and
    the extension portions are provided for each separate one of all of the side portions.

6. A display device comprising:
    the lighting device according to claim 1; and
    a display panel that displays an image with light emitted from the lighting device.

* * * * *